US012275213B1

(12) United States Patent
Hines

(10) Patent No.: US 12,275,213 B1
(45) Date of Patent: Apr. 15, 2025

(54) METHOD FOR MANUFACTURING A DISPOSABLE BIODEGRADABLE BAG

(71) Applicant: Thaddeus Hines, Savannah, GA (US)

(72) Inventor: Thaddeus Hines, Savannah, GA (US)

( * ) Notice: Subject to any disclaimer, the term of this patent is extended or adjusted under 35 U.S.C. 154(b) by 0 days.

(21) Appl. No.: 18/515,475

(22) Filed: Nov. 21, 2023

(51) Int. Cl.
*B31B 70/68* (2017.01)
*B31B 70/26* (2017.01)
*B31B 70/86* (2017.01)
*B31B 150/00* (2017.01)
*B31B 160/10* (2017.01)
*B31B 170/20* (2017.01)

(52) U.S. Cl.
CPC ............ *B31B 70/68* (2017.08); *B31B 70/262* (2017.08); *B31B 70/864* (2017.08); *B31B 2150/002* (2017.08); *B31B 2160/102* (2017.08); *B31B 2170/20* (2017.08)

(58) Field of Classification Search
None
See application file for complete search history.

(56) References Cited

U.S. PATENT DOCUMENTS

| | | | | |
|---|---|---|---|---|
| 2,425,683 A | 8/1947 | Martin | | |
| 2,635,510 A * | 4/1953 | Grant | B31B 70/864 | 271/12 |
| 3,034,409 A * | 5/1962 | Finke | B31B 70/864 | 493/926 |
| 3,507,194 A * | 4/1970 | August | B31B 70/00 | 493/224 |
| 4,307,764 A | 12/1981 | Nattrass | | |
| 9,144,278 B2 | 9/2015 | Morrow | | |
| 10,787,298 B1 | 9/2020 | McMillan | | |
| D915,219 S | 4/2021 | Bojaxhi | | |
| 11,350,712 B2 | 6/2022 | Bojaxhi | | |
| 2005/0119101 A1* | 6/2005 | Constant | B31B 70/00 | 493/221 |
| 2009/0092341 A1 | 4/2009 | Mallory | | |
| 2013/0156350 A1 | 6/2013 | Turner | | |
| 2014/0056543 A1* | 2/2014 | Lay | B65D 33/004 | 493/267 |

FOREIGN PATENT DOCUMENTS

| | | | | |
|---|---|---|---|---|
| CN | 114228255 A * | 3/2022 | B31B 70/04 |
| WO | WO2012094693 | 7/2012 | |

* cited by examiner

*Primary Examiner* — Tanzim Imam

(57) ABSTRACT

A method for manufacturing a disposable biodegradable bag for carrying items then discarding the bag without creating unwanted pollution includes providing a first rectangular sheet of biodegradable material having a first top edge, a first bottom edge, and a first pair of lateral side edges. The first rectangular sheet of biodegradable material may be a first biodegradable dryer sheet. The method further includes providing a second rectangular sheet of biodegradable material having a second top edge, a second bottom edge, and a second pair of lateral side edges. The second rectangular sheet of biodegradable material may be a second biodegradable dryer sheet. The method further includes coupling the first bottom edge to the second bottom edge and coupling the first pair of lateral side edges to the second pair of lateral side edges to form a bag having an opening between the first top edge and the second top edge.

6 Claims, 6 Drawing Sheets

METHOD FOR MANUFACTURING A DISPOSABLE BIODEGRADABLE BAG

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to disposable bags and more particularly pertains to a new disposable bag for carrying items then discarding the bag without creating unwanted pollution.

(2) Description of Related Art Including Information Disclosed Under 37 CFR 1.97 and 1.98

The prior art relates to disposable bags. Disposable bags are typically made of plastic, which can take decades, or more, to decompose. However, people use disposable plastic bags for many things, such as groceries, transporting purchases, and food storage. Some prior art references disclose reusable, cloth bags and totes that can be used in place of plastic grocery bags. Such cloth bags may be better for the environment than the disposable plastic alternatives but can be difficult for people to remember to bring with them to stores. The cloth bags can thus accumulate in a person's house, while the person forgets to use or dispose of them. Thus, there is a need in the art for a biodegradable bag that can be discarded after a single use without creating unwanted pollution.

BRIEF SUMMARY OF THE INVENTION

An embodiment of the disclosure meets the needs presented above by generally comprising providing a first rectangular sheet of biodegradable material having a first top edge, a first bottom edge, and a first pair of lateral side edges. The first rectangular sheet of biodegradable material may comprise a first biodegradable dryer sheet. The embodiment further comprises providing a second rectangular sheet of biodegradable material having a second top edge, a second bottom edge, and a second pair of lateral side edges. The second rectangular sheet of biodegradable material may comprise a second biodegradable dryer sheet. The embodiment further comprises coupling the first bottom edge to the second bottom edge and coupling the first pair of lateral side edges to the second pair of lateral side edges to form a bag having an opening between the first top edge and the second top edge providing access to an interior space of the bag.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
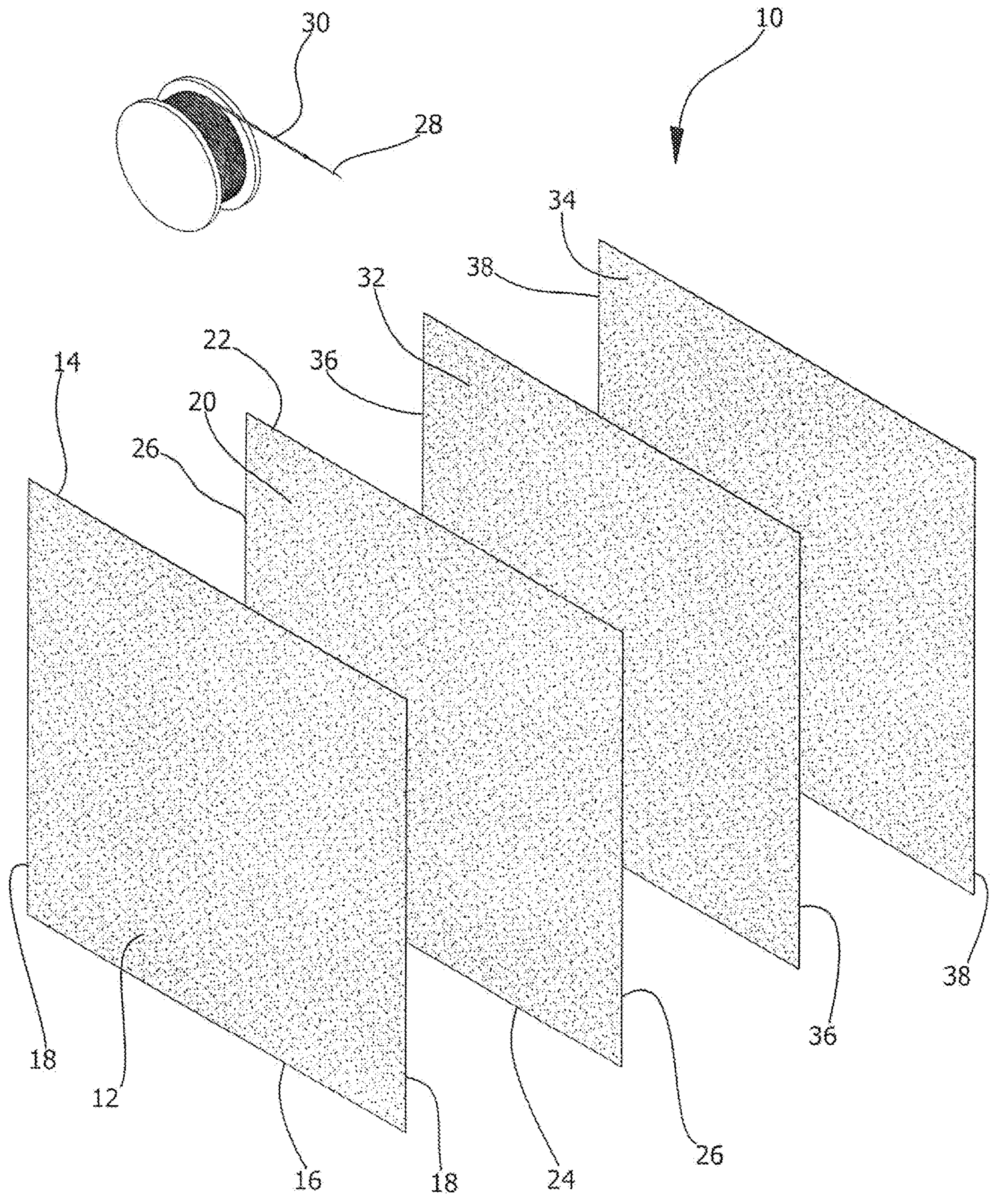
FIG. 1 is an isometric view of a method for manufacturing a disposable biodegradable bag according to an embodiment of the disclosure.
Figure 2:
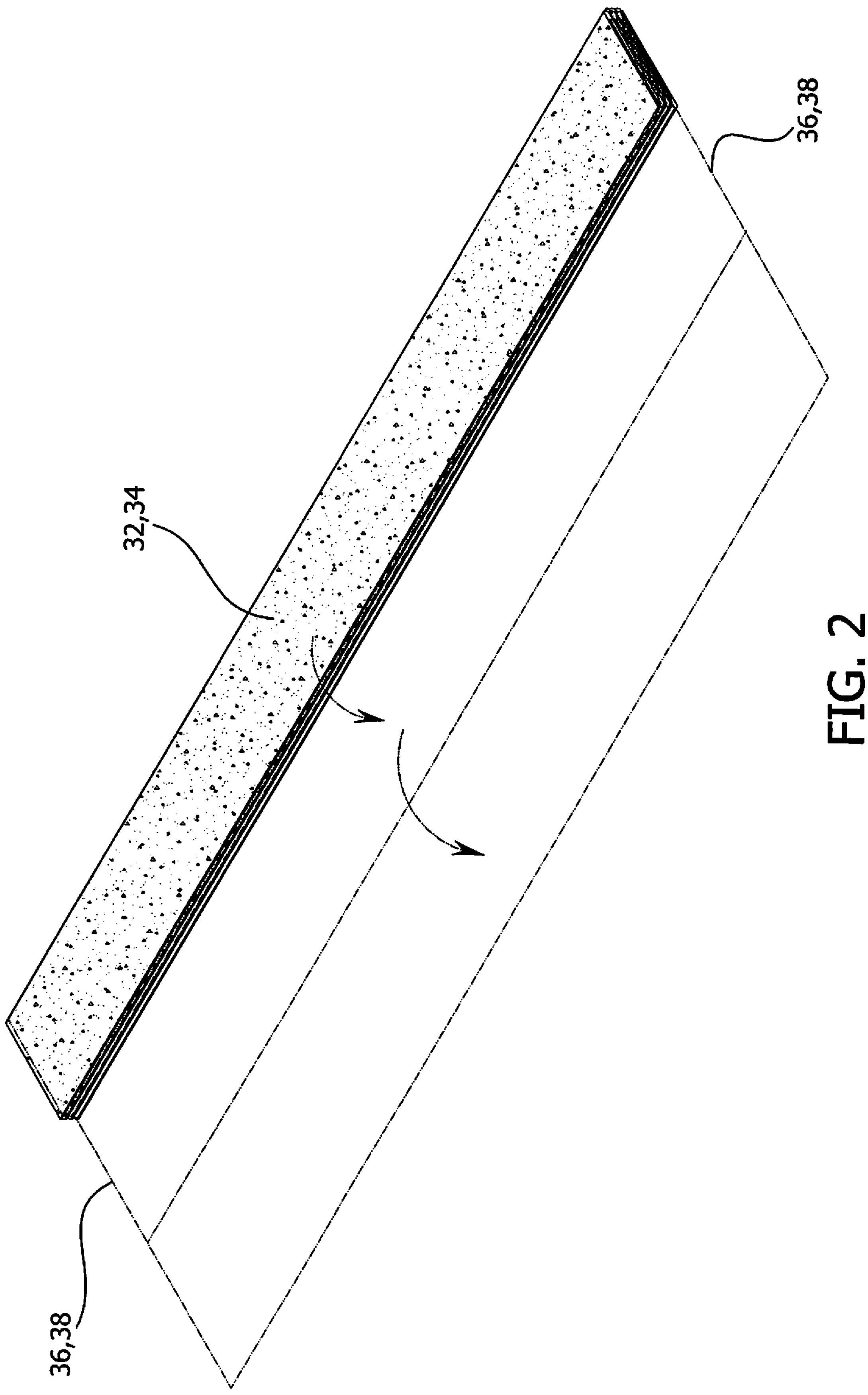
FIG. 2 is a detail view of an embodiment of the disclosure.
Figure 3:
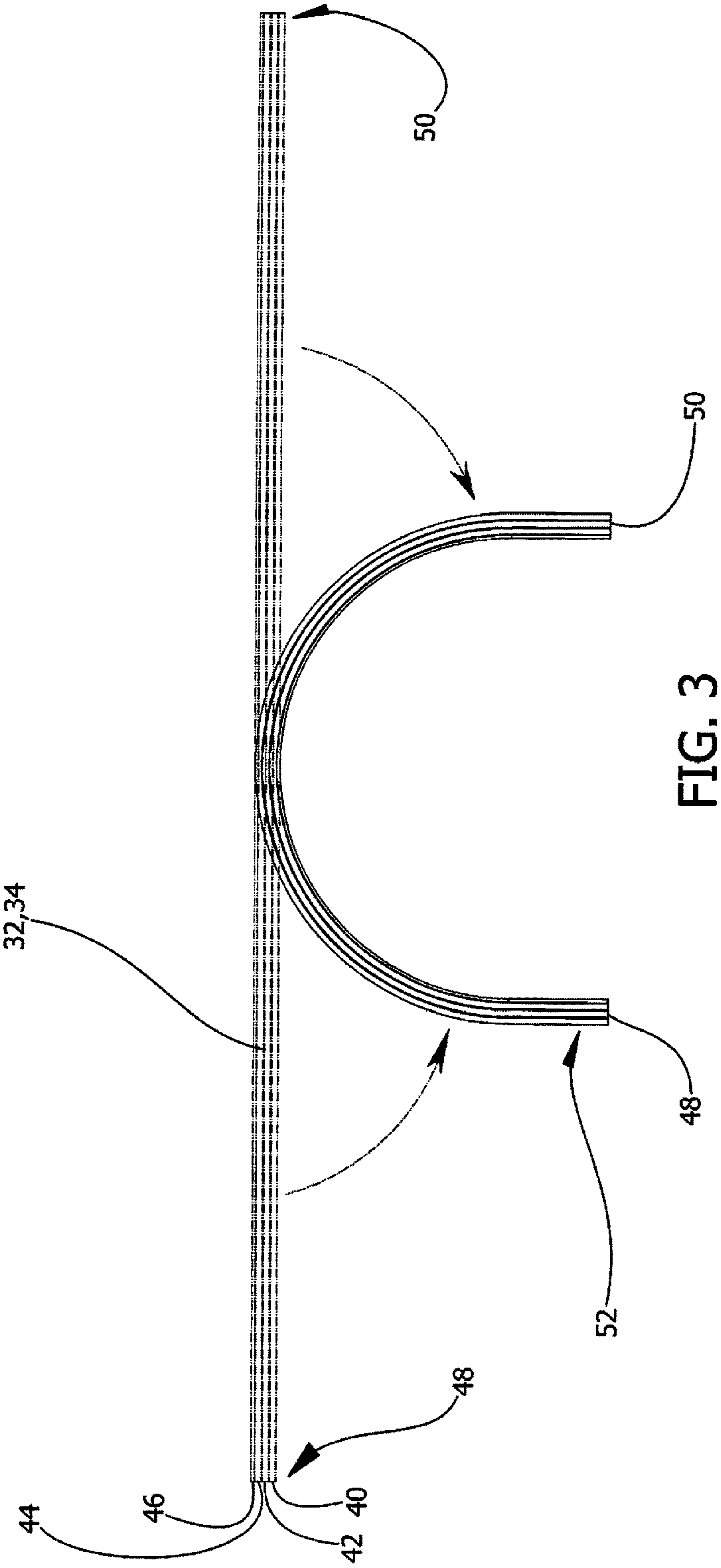
FIG. 3 is a detail view of an embodiment of the disclosure.
Figure 4:
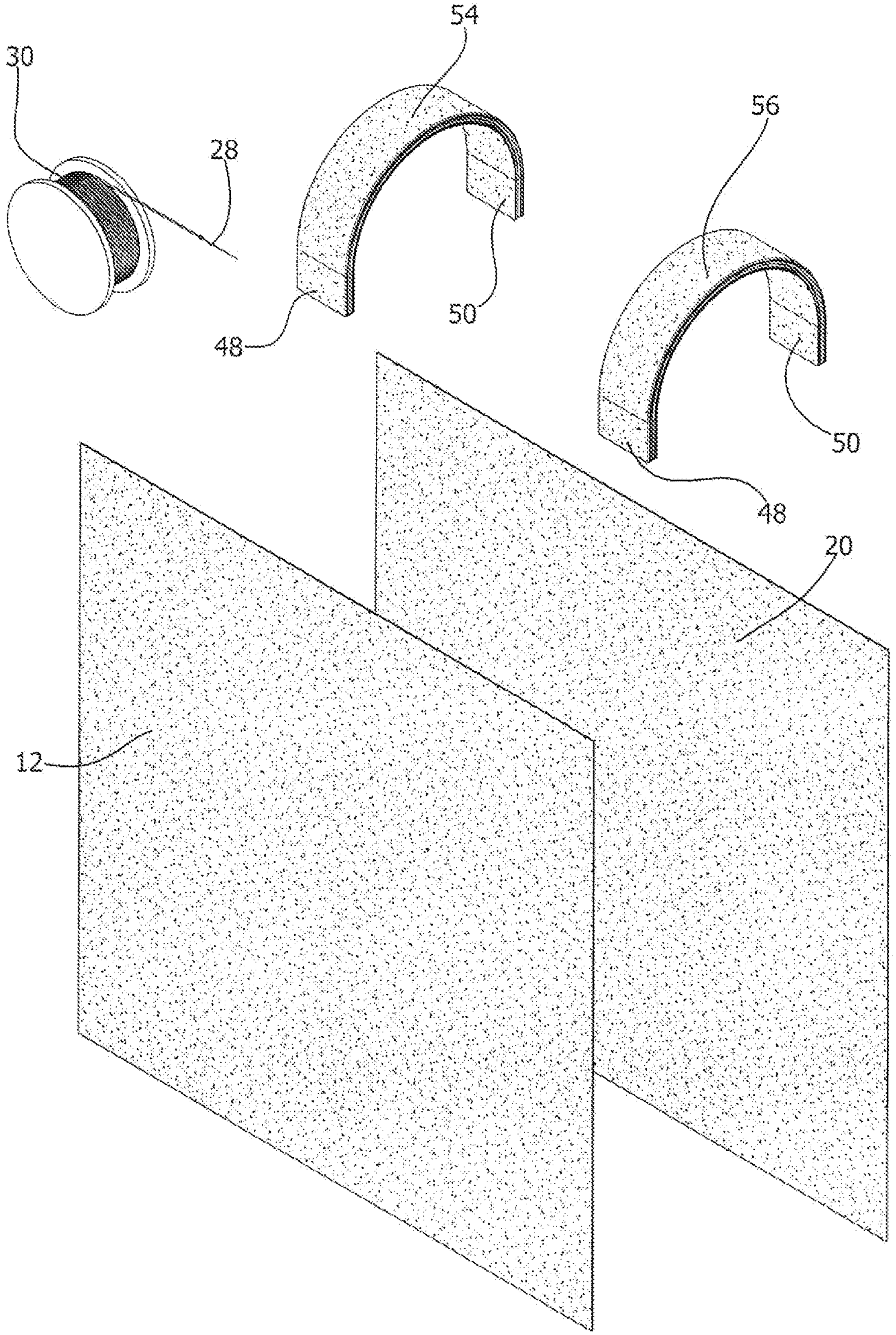
FIG. 4 is an isometric view of an embodiment of the disclosure.
Figure 5:
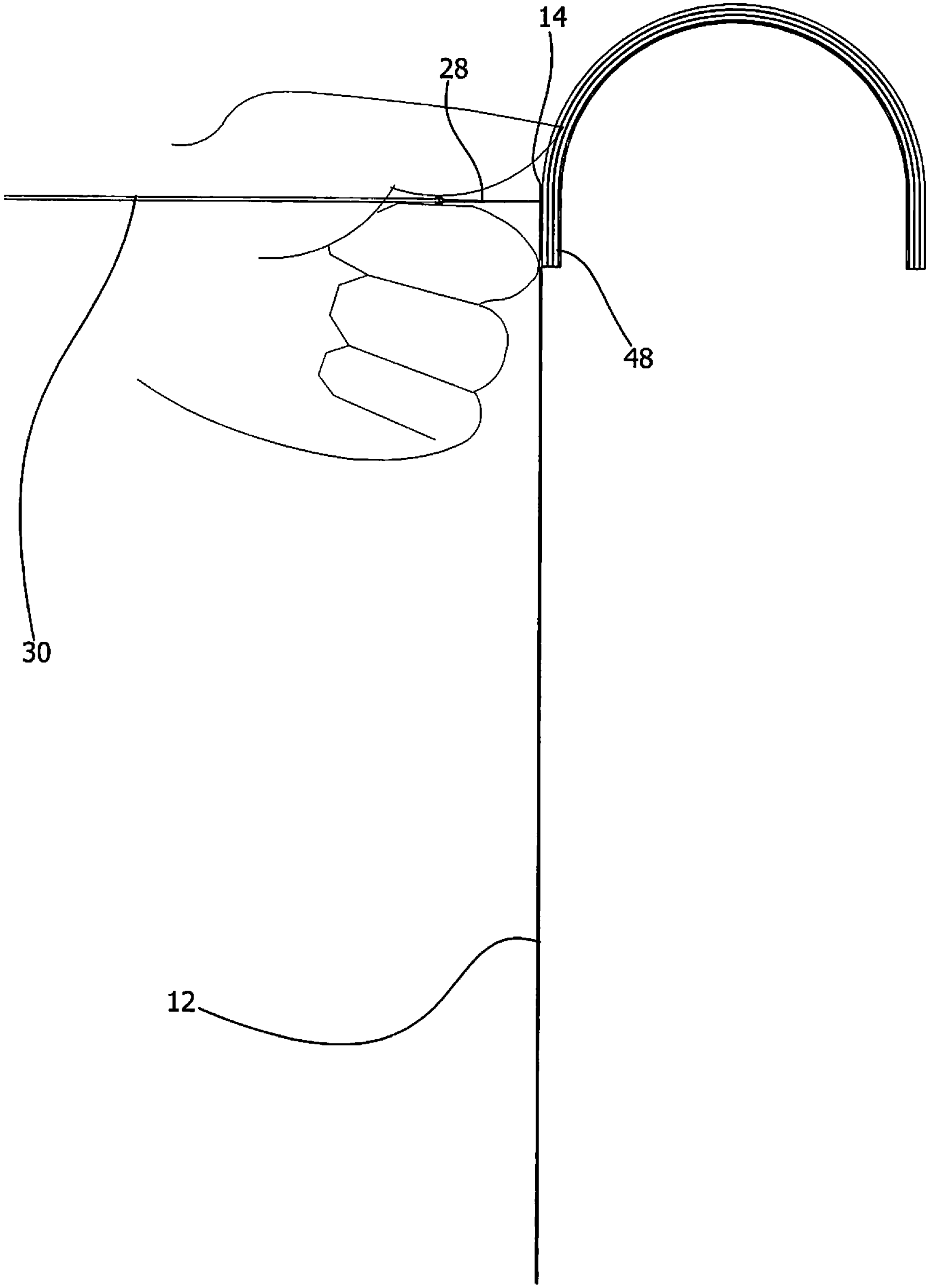
FIG. 5 is a side view of an embodiment of the disclosure.
Figure 6:
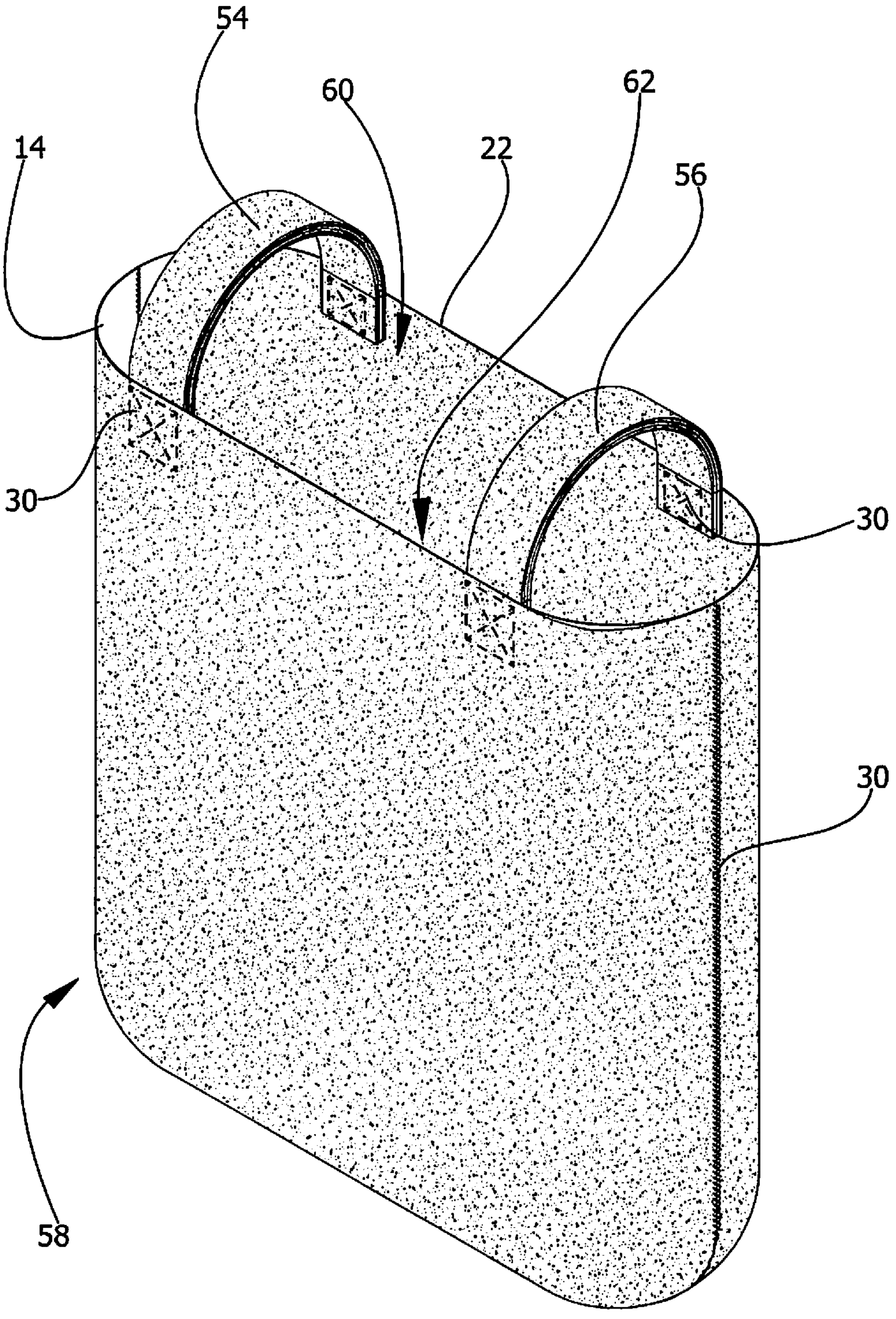
FIG. 6 is an isometric view of an embodiment of the disclosure.

With reference now to the drawings, and in particular to FIGS. 1 through 6 thereof, a new disposable bag embodying the principles and concepts of an embodiment of the disclosure and generally designated by the reference numeral 10 will be described.

As best illustrated in FIGS. 1 through 6, the method for manufacturing a disposable biodegradable bag 10 generally comprises providing a first rectangular sheet of biodegradable material 12 having a first top edge 14, a first bottom edge 16, and a first pair of lateral side edges 18. The first rectangular sheet of biodegradable material 12 may comprise a first biodegradable dryer sheet.

The method for manufacturing a disposable biodegradable bag 10 further comprises providing a second rectangular sheet of biodegradable material 20 having a second top edge 22, a second bottom edge 24, and a second pair of lateral side edges 26. The second rectangular sheet of biodegradable material 20 may comprise a second biodegradable dryer sheet.

The method 10 further comprises coupling the first bottom edge 14 to the second bottom edge 16 and coupling the first pair of lateral side edges 18 to the second pair of lateral side edges 26 to form a bag 58 having an opening 60 between the first top edge 14 and the second top edge 22 providing access to an interior space 62 of the bag 58. The coupling of the first rectangular sheet of biodegradable material 12 to the second rectangular sheet of biodegradable material 20 may further comprise stitching the first bottom edge 16 to the second bottom edge 24 and stitching the first pair of lateral side edges 18 to the second pair of lateral side edges 26. For example, a needle 28 and a biodegradable thread 30 may be used to stitch the first 16 and second 24 bottom edges and the first 18 and second 26 pair of lateral side edges together.

A third rectangular sheet of biodegradable material 32 may be provided. The third rectangular sheet of biodegradable material 32 may have a third pair of lateral side edges 36 extending between a third top edge and a third bottom edge. The third rectangular sheet of biodegradable material 32 may comprise a third biodegradable dryer sheet. A fourth rectangular sheet of biodegradable material 34 having a fourth pair of lateral side edges 38 extending between a fourth top edge and a fourth bottom edge may also be provided. The fourth rectangular sheet of biodegradable material 34 may comprise a fourth biodegradable dryer sheet.

In alternative embodiments, each of the first rectangular sheet of biodegradable material 12, the second rectangular sheet of biodegradable material 20, the third rectangular sheet of biodegradable material 32, and the fourth rectangular sheet of biodegradable material 34 may comprise a biodegradable fabric material, such as organic cotton, bamboo textiles, linen, wood pulps, or vegetable fibers.

The method 10 may further comprise folding each of the third rectangular sheet of biodegradable material 32 and the fourth rectangular sheet of biodegradable material 34 a first time along a longitudinal axis, or along the third 36 and fourth 38 pair of lateral side edges, respectively, thereby defining a first layer 40 and a second layer 42 and defining a first end 48 and a second end 50 for each of the third rectangular sheet of biodegradable material 32 and the fourth rectangular sheet of biodegradable material 34.

In some embodiments, each of the third rectangular sheet of biodegradable material 32 and the fourth rectangular sheet of biodegradable material 34 may be folded a second time along the longitudinal axis thereby defining a third layer 44 for each of the third 32 and fourth 34 rectangular sheet of biodegradable material. Embodiments may also include folding each of the third rectangular sheet of biodegradable material 32 and the fourth rectangular sheet of biodegradable material 34 a third time along the longitudinal axis thereby defining a fourth layer 46.

The method 10 may further comprise coupling the first layer 40, the second layer 42, the third layer 44, and the fourth layer 46 of each of the third rectangular sheet of biodegradable material 32 and the fourth rectangular sheet of biodegradable material 34 together by stitching proximate to each of the first end 48 and the second end 50. If the third rectangular sheet of biodegradable material 32 includes fewer than four layers, for example if the third rectangular sheet of biodegradable material 32 is only folded a first time, the resultant first 40 and second 42 layers may be coupled together. If the third rectangular sheet of biodegradable material 32 includes more than four layers, for example if the third rectangular sheet of biodegradable material 32 is also folded a fourth time, the resultant five layers may be coupled together.

Some embodiments may further include bending the third rectangular sheet of biodegradable material 32 whereby the third rectangular sheet of biodegradable material 32 is convexly arcuate between the first end 48 and the second end 50 thereby forming a handle shape 52. The fourth rectangular sheet of biodegradable material 34 may also be folded whereby the fourth rectangular sheet of biodegradable material 34 is convexly arcuate between the first end 48 and the second end 50 thereby forming the handle shape 52.

Embodiments may further comprise coupling the first end 48 of the third rectangular sheet of biodegradable material 32 to the first top edge 14 of the first rectangular sheet of biodegradable material 12 and coupling the first end 48 of the fourth rectangular sheet of biodegradable material 34 to the first top edge 14 of the first rectangular sheet of biodegradable material 12. The fourth rectangular sheet of biodegradable material 34 may be spaced from the third rectangular sheet of biodegradable material 32 along the first top edge 14 of the first rectangular sheet of biodegradable material 12.

Embodiments may further include coupling the second end 50 of the third rectangular sheet of biodegradable material 32 to the second top edge 22 of the second rectangular sheet of biodegradable material 20. The second end 50 of the third rectangular sheet of biodegradable material 32 may be aligned with the first end 48 of the third rectangular sheet of biodegradable material 32 thereby forming a first handle 54 extending across the opening 60.

The method 10 may further include coupling the second end 50 of the fourth rectangular sheet of biodegradable material 34 to the second top edge 22 of the second rectangular sheet of biodegradable material 20. The second end 50 of the fourth rectangular sheet of biodegradable material 34 may be aligned with the first end 48 of the fourth rectangular sheet of biodegradable material 34 thereby forming a second handle 58 extending across the opening 60. coupling the first end 48 of each of the third rectangular sheet of biodegradable material 32 and the fourth rectangular sheet of biodegradable material 34 to the first top edge 14 of the first rectangular sheet of biodegradable material 12 may comprise stitching the first end 48 to the first top edge 14. Coupling the second end 50 of each of the third rectangular sheet of biodegradable material 32 and the fourth rectangular sheet of biodegradable material 34 to the second top edge 22 of the second rectangular sheet of biodegradable material 20 may comprise stitching the second end 50 to the second top edge 22.

In alternative embodiments, the sheets of biodegradable material may be stitched or otherwise coupled together to form other types of bags. For example, the first 12 and second 20 rectangular sheet of biodegradable material may be stitched together to form a sandwich bag, with a flap for closing the sandwich bag. In some embodiments, the flap may be formed by one of the first 12 and second 20 rectangular sheets of biodegradable material. In other embodiments, the flap may be formed by coupling the third rectangular sheet of biodegradable material 32 to the sandwich bag. Other forms or types of closures may also be used, such as interlocking ridges positioned near the opening 60 that can be pressed together to close the opening.

In use, the method 10 can be used to manufacture a bag 58 for use in transporting groceries or other goods after purchase. The method 10 can also be used to manufacture a bag 58 for food storage. The bag 58 is formed of biodegradable materials, and can thus be thrown away or disposed of after a single use without causing unwanted pollution.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A method of making a bag, the method comprising:

providing a first rectangular sheet of biodegradable material having a first top edge, a first bottom edge, and a first pair of lateral side edges, the first rectangular sheet of biodegradable material comprising a first biodegradable dryer sheet;

providing a second rectangular sheet of biodegradable material having a second top edge, a second bottom edge, and a second pair of lateral side edges, the second rectangular sheet of biodegradable material comprising a second biodegradable dryer sheet;

coupling the first rectangular sheet of biodegradable material and the second rectangular sheet of biodegradable material together by coupling the first bottom edge to the second bottom edge and coupling the first pair of lateral side edges to the second pair of lateral side edges to form a bag having an opening between the first top edge and the second top edge providing access to an interior space of the bag;

providing a third rectangular sheet of biodegradable material and a fourth rectangular sheet of biodegradable material;

folding each of the third rectangular sheet of biodegradable material and the fourth rectangular sheet of biodegradable material along a longitudinal axis thereby defining a first end and a second end for each of the third rectangular sheet of biodegradable material and the fourth rectangular sheet of biodegradable material;

coupling the first end of the third rectangular sheet of biodegradable material to the first top edge;

coupling the first end of the fourth rectangular sheet of biodegradable material to the first top edge, the fourth rectangular sheet of biodegradable material being spaced from the third rectangular sheet of biodegradable material along the first top edge;

coupling the second end of the third rectangular sheet of biodegradable material to the second to edge, the second end of the third rectangular sheet of biodegradable material being aligned with the first end of the third rectangular sheet of biodegradable material thereby forming a first handle extending across the opening; and coupling the second end of the fourth rectangular sheet of biodegradable material to the second top edge, the second end of the fourth rectangular sheet of biodegradable material being aligned with the first end of the fourth rectangular sheet of biodegradable material thereby forming a second handle extending across the opening.

2. The method of claim 1, coupling the first rectangular sheet of biodegradable material and the second rectangular sheet of biodegradable material together further comprising stitching the first bottom edge to the second bottom edge.

3. The method of claim 1, coupling the first rectangular sheet of biodegradable material and the second rectangular sheet of biodegradable material together further comprising stitching the first pair of lateral side edges to the second pair of lateral side edges.

4. The method of claim 1, the third rectangular sheet of biodegradable material further comprising a third biodegradable dryer sheet and the fourth rectangular sheet of biodegradable material further comprising a fourth biodegradable dryer sheet.

5. The method of claim 1, coupling the first end of each of the third rectangular sheet of biodegradable material and the fourth rectangular sheet of biodegradable material to the first top edge further comprising stitching the first end to the first top edge, and coupling the second end of each of the third rectangular sheet of biodegradable material and the fourth rectangular sheet of biodegradable material to the second top edge further comprising stitching the second end to the second top edge.

6. A method of making a shopping bag, the method comprising:

providing a first rectangular sheet of biodegradable material having a first top edge, a first bottom edge, and a first pair of lateral side edges, the first rectangular sheet of biodegradable material comprising a first biodegradable dryer sheet;

providing a second rectangular sheet of biodegradable material having a second top edge, a second bottom edge, and a second pair of lateral side edges, the second rectangular sheet of biodegradable material comprising a second biodegradable dryer sheet; and coupling the first rectangular sheet of biodegradable material and the second rectangular sheet of biodegradable material together by coupling the first bottom edge to the second bottom edge and coupling the first pair of lateral side edges to the second pair of lateral side edges to form a bag having an opening between the first top edge and the second top edge providing access to an interior space of the bag, coupling the first rectangular sheet of biodegradable material and the second rectangular sheet of biodegradable material together further comprising stitching the first bottom edge to the second bottom edge and stitching the first pair of lateral side edges to the second pair of lateral side edges;

providing a third rectangular sheet of biodegradable material comprising a third biodegradable dryer sheet;

providing a fourth rectangular sheet of biodegradable material comprising a fourth biodegradable dryer sheet;

folding each of the third rectangular sheet of biodegradable material and the fourth rectangular sheet of biodegradable material a first time along a longitudinal axis thereby defining a first layer and a second layer and defining a first end and a second end for each of the third rectangular sheet of biodegradable material and the fourth rectangular sheet of biodegradable material;

folding each of the third rectangular sheet of biodegradable material and the fourth rectangular sheet of biodegradable material a second time along the longitudinal axis thereby defining a third layer;

folding each of the third rectangular sheet of biodegradable material and the fourth rectangular sheet of biodegradable material a third time along the longitudinal axis thereby defining a fourth layer;

coupling the first end of the third rectangular sheet of biodegradable material to the first top edge;

coupling the first end of the fourth rectangular sheet of biodegradable material to the first top edge, the fourth rectangular sheet of biodegradable material being spaced from the third rectangular sheet of biodegradable material along the first top edge;

coupling the second end of the third rectangular sheet of biodegradable material to the second top edge, the second end of the third rectangular sheet of biodegradable material being aligned with the first end of the third rectangular sheet of biodegradable material thereby forming a first handle extending across the opening; and coupling the second end of the fourth rectangular sheet of biodegradable material to the second top edge, the second end of the fourth rectangular sheet of biodegradable material being aligned with the first end of the fourth rectangular sheet of biodegradable material thereby forming a second handle extending across the opening;

wherein coupling the first end of each of the third rectangular sheet of biodegradable material and the fourth rectangular sheet of biodegradable material to the first top edge comprises stitching the first end to the first top edge; and wherein coupling the second end of each of the third rectangular sheet of biodegradable material and the fourth rectangular sheet of biodegradable maternal to the second top edge comprises stitching the second end to the second top edge.

* * * * *